United States Patent Office 3,438,472
Patented Apr. 15, 1969

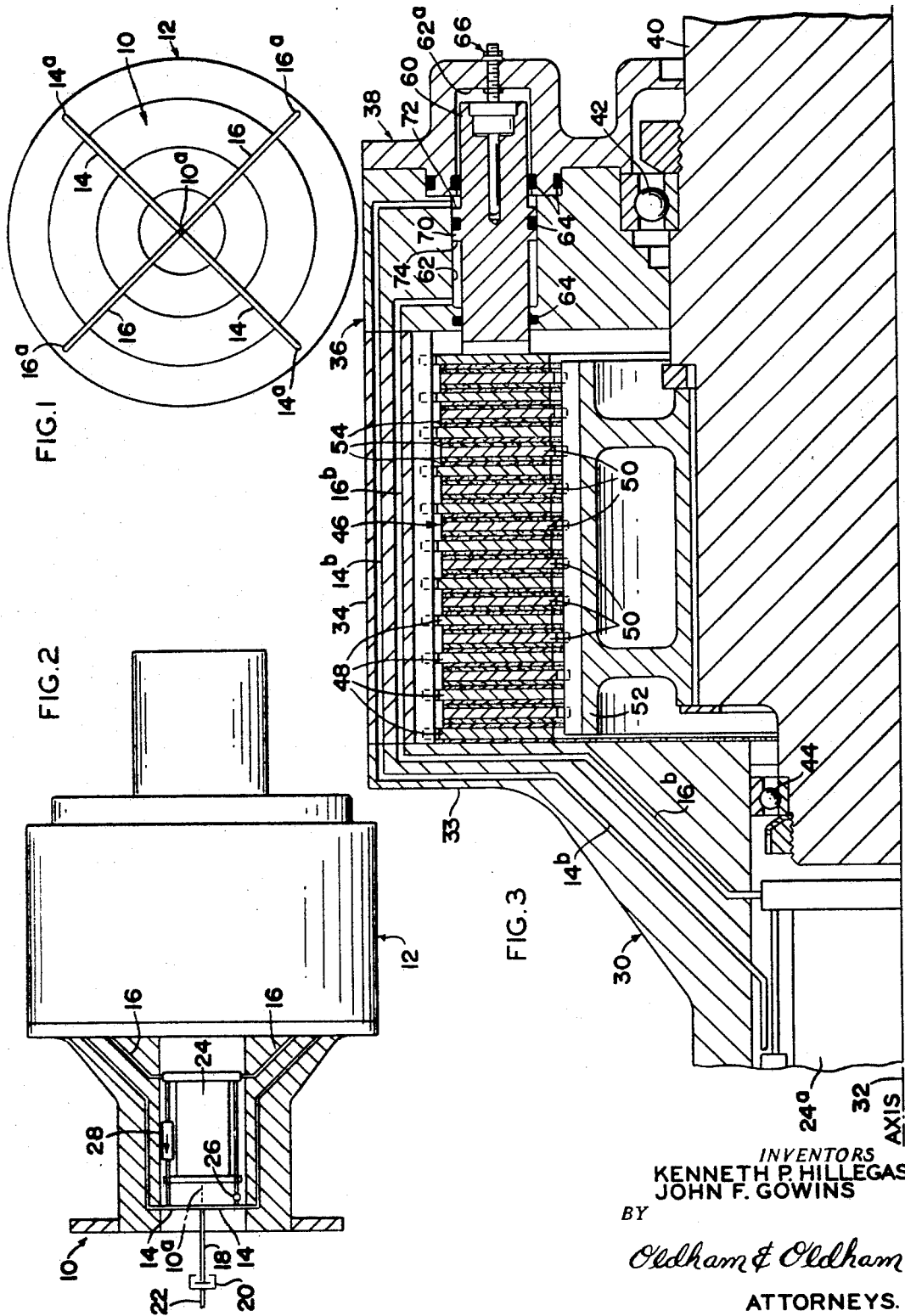

3,438,472
CLUTCH WITH CENTRIFUGALLY BALANCED
PISTON AND ACCUMULATOR
Kenneth P. Hillegass, Copley, and John F. Gowins, Massillon, Ohio, assignors to The Goodyear Tire & Rubber Company, Akron, Ohio, a corporation of Ohio
Filed June 29, 1967, Ser. No. 649,931
Int. Cl. F16d 25/08, 43/284
U.S. Cl. 192—106         5 Claims

ABSTRACT OF THE DISCLOSURE

A rotating clutch utilizing interleaved internally and externally driven discs in the usual manner with a pressure plate and applying piston, where the piston rotates with a continuously rotating member so that centrifugal force acts upon the hydraulic fluid utilized to actuate the piston which is characterized by the piston having opposed actuating surfaces whereby a static hydraulic pressure acts on one surface and an active hydraulic pressure acts on the other surface so that the pressure developed by centrifugal force in both the active and static hydraulic fluids on both actuating surfaces of the piston will cancel each other, and thereby prevent actuation of the piston by centrifugal force increasing the pressure of the active hydraulic fluid supplied to the piston. The static hydraulic line feeds into a spring-charged accumulator mounted on substantially the center line of the continuously rotating element and effects release of the clutch when actuating pressure to the active hydraulic line is released. An automatic clearance adjusting device is incorporated into the piston to maintain constant operating clearance between the clutch discs throughout the clutch life.

*Clutch with balanced piston*

The objects of the invention are to provide a continuously rotating clutch which can be quickly engaged and disengaged by hydraulic piston actuation wherein the hydraulic piston is located at a spaced radial distance from the center line of rotation of the clutch which utilizes a compensating piston to counterbalance hydraulic pressures built up in the piston actuation line by the centrifugal force occasioned because of the rotation of the clutch.

For a better understanding of the invention reference should be had to the accompanying drawings wherein:

FIG. 1 is an end schematic illustration of the clutch showing the paths of the hydraulic fluid application to the actuating piston and the balance of compensating piston utilized to achieve the features of the invention;

FIG. 2 is a cross-sectional illustration of the hydraulic actuating system associated with the clutch showing the spring-loaded accumulator and the radial relationship of the actuating piston pressure line and balance or compensating piston pressure lines to the clutch, as well as further necessary hydraulic features in the balance or compensating piston pressure lines; and FIG. 3 is an enlarged, cross-sectional elevational view of the clutch, actuating piston, compensating piston, and disc stack incorporating the piston actuating features comprising a preferred embodiment of the invention.

In rotating disc-type clutches or brakes where it is necessary for the actuating hydraulic pistons to rotate because of the necessity to connect by friction action a rotating member to another rotating member, depending upon the displaced relationship of the actuating piston from the center line of the rotating members, and the r.p.m. of the rotating members, large pressures in the hydraulic actuating fluid for the clutch or brake can be built up caused by centrifugal force. In fact, the amount of pressure proportional to the square of the r.p.m. of the members, and directly proportional to the radius or radial displacement of the actuating piston from the center line of the rotating element. Hence, some way to compensate for the increase in pressure caused by centrifugal force to the actuating hydraulic fluid is necessary to prevent clutch or brake actuation by the action of such centrifugal force on the hydraulic fluid.

The form of the invention illustrated in the drawings is a clutch, but the features of the invention might also be incorporated into a brake design. With reference to the form of the invention shown in the drawings, FIG. 1 illustrates a rotating element indicated generally by numeral 10 and a disc-type clutch indicated generally by numeral 12. The principle of the invention is achieved as shown schematically in the drawing by providing hydraulic actuation lines 14 extending from substantially the center line of the rotating element 10 out to an inlet 14a adjacent the outer peripheral edges of the clutch 12. In actual construction, the lines 14 will be machined into the clutch housing. The hydraulic actuation lines 14 extend a certain radial displacement from the center line or axis 10a of rotating element 10, as they feed into the actuating piston to be more fully defined hereinafter, and hence develop centrifugal force on the hydraulic fluid carried therein dependent upon the rotational speed of the rotating element 10 and the radial displacement. In order to compensate for the increased hydraulic pressure occasioned by the development of centrifugal force, the invention provides compensating hydraulic lines 16 to extend from the center line 10a out to inlets 16a at substantially the same radial displacement as inlets 14a of actuating lines 14. Hence, in this manner, the compensating lines 16 develop substantially the same amount of hydraulic pressure caused by the development of centrifugal force. It is not required to accomplish the desired compensation that the hydraulic lines 14 and 16 be equal in number and of the same size. However, the piston chambers into which they feed must be of substantially the same size and the same radial displacement from the rotating axis of the clutch.

FIG. 2 illustrates that both the hydraulic lines 14 and 16 feed off a central actuating supply line 18 which is coupled through a rotary seal 20 to an actuating supply 22 which may be provided in any conventional manner. The compensating lines 16 feed from a spring-charged accumulator 24 which is axially aligned and centrally positioned on the center line 10a of rotating element 10. A bypass valve 26 connects the accumulator to one of the supply or actuating lines 14, while a check valve 28 connects the other side of the accumulator to another actuating line 14. Hence, if the pressure in the accumulator becomes higher than desired, check valve 28 functions to relieve the pressure when the pressure in the actuating lines is released. Further, if because of leaks, evaporation, or the like, the fluid in the compensating lines 16 decreases, further fluid can be added through the bypass valve 26. The exact purpose of the spring loading in the accumulator 24 will be more fully defined hereinafter.

For an understanding of a preferred construction for the clutch of the invention, reference should be had to FIG. 3 of the drawings wherein a continuously rotating element is indicated generally by numeral 30. The rotating axis of element 30 is indicated by numeral 32 at the bottom of the cross-sectional cut in the drawing. The element 30 has an outwardly extending annular flange 33 which has an annular clutch housing or drum 34 operatively secured thereto in any convenient manner. The drum 34 mounts an annular piston actuation unit 36 in fixed relationship thereto, again in any convenient manner. A removable annular piston head 38 mounted to piston unit 36 completes the fixed assembly which rotates with element 30.

A rotatable member or element 40 positioned internally of the annular housing or drum 34 is rotatably mounted to the piston unit 36 by a suitable bearing 42 and with respect to element 30 by a suitable bearing 44. In order to provide a clutching action between elements 30 and 40 in the usual manner, the invention utilizes a plurality of friction discs, indicated generally as a group by numeral 46. In effect, every other disc 48 is splined to the annular housing or drum 34, with the alternate discs 50 splined to an annular inner ring 52 which is fixedly secured as a sleeve around element 40. The splined relationship insures that discs 48 will rotate with the housing or drum 34 and discs 50 will rotate with inner drum 52, but that all the discs are slidable axially relative to axis 32 so as to achieve the clutching action desired. The inner surface of the annular radially extending flange 33 of element 30 provides a backing plate or stop for the stack of discs 46. In order to achieve a frictional action between the interleaved discs 48 and 50, each disc normally has a sintered lining 54 on both outer surfaces thereof. The use of such a sintered frictional lining on the surfaces of clutch or brake discs is well known in the art, and is more fully defined in U.S. Patent No. 2,947,388.

The axial actuation of the stack of discs 46 is accomplished by a piston 60 slidably carried in a cylinder 62 formed in piston unit 36, and a mating cylinder 62a in the piston head 38. Appropriate O-ring seals, each indicated generally by numeral 64 are provided around the piston 60 with respect to unit 36 and head 38 to prevent the leakage of hydraulic fluid utilized to actuate the piston. As a useful feature, but not necessary to achieve the objects of the invention, a wear compensating unit, indicated generally by numeral 66 may be associated with piston 60 to compensate for the wear of the sintered layers 54 on the discs 46 as the clutch is used so that a constant clearance is provided in the non-actuated position. A typical apparatus to this purpose is shown in U.S. Patent No. 2,878,901.

Since the element 30 is normally a rather continuously rotating member, and since the piston 60 is radially offset from axis 32 by a substantial distance in order to apply pressure to the stack of discs 46 and press them against the radially extending flange 33, centrifugal force acting upon the hydraulic fluid passed to the piston 60 through actuating line 14b increases the hydraulic fluid pressure thereto. Hence, if the r.p.m. of element 30 is large enough in combination with the radial offset of actuating line 14b, the piston 60 may be actuated at an undesirable time, simply because of the increase in hydraulic fluid pressure caused by centrifugal force on the fluid itself. The purpose of the invention is to overcome this possibility and make the piston 60 static or in balance during periods of high r.p.m. of element 30 so as to make the clutch actuate only when the hydraulic fluid pressure in actuating line 14b is increased because it is desired to actuate the piston 60.

In order to accomplish the compensating or balancing action piston 60 is provided with a raised annular land 70 which in effect defines actuating surfaces 72 and 74 on each side thereof, all as best seen in FIG. 3. An actuating line 14b provides hydraulic fluid to the piston so as to act upon surface 72 of land 70 tending to force piston 60 to the left and compress the discs 46 into frictional engagement with each other. The compensating action is provided by a static fluid head from an accumulator 24a mounted substantially on the axis 32 with a static or compensating hydraulic line 16b extending therefrom and feeding into cylinder 62 so as to act upon surface 74 of land 70. The hydraulic pressure from accumulator 24a through compensating line 16b is preferably at a static or nearly atmospheric pressure. It should be understood that it is not important for line 16b to be of substantially the same radial displacement from axis 32 as line 14b throughout its length before it feeds into cylinder 62 to act on surface 74 as long as the lines or passages 14b and 16b both feed into the cylinder at the same radial displacement from the axis 32. Hence, there is a substantially exact balance or compensation occurring between surfaces 72 and 74 of land 70 caused by centrifugal force acting on the hydraulic fluid in lines 14b and 16b. In fact, it is desirable to have surface 74 be of substantially the same area as surface 72 so that there may not be a tendency to push piston 60 in either direction during periods of high r.p.m. thereby providing a safety factor against the clutch actuating when such action is not desired.

In order to provide a return of piston 60 after a desired actuation, the mechanism functions as follows: Actuation is achieved by increasing the pressure in line 14b thereby causing piston 60 to move to the left and stack the discs 46 into a frictional engaging relationship. This causes the hydraulic fluid in line 16b to be forced somewhat back into the accumulator caused by the leftward movement of piston 60 since the entrance of passage 16b into the cylinder 62 is at the extreme left end, again as seen in FIG. 3. The accumulator 24a, as it falls upon the leftward movement of piston 60 since it is spring-loaded, will build pressure in line 16b greater than the pressure caused by centrifugal force. As an example of this action, the pressure in line 16b might be about 2 pounds at static, non-rotating conditions, or exclusive of the centrifugal force acting thereof, and about 8 pounds caused by the spring-loading when the piston 60 is actuated. This increase in pressure thus acts as a return spring or return force to push piston 60 back to the right after actuation thereof when pressure in line 14b has been released and drops back to a static condition. Thus, the necessity of a return spring, or the like, is eliminated as the spring action in accumulator 24a acting through the hydraulic fluid in passage 16b provides this desired effect.

It should be understood that actuating lines or passages 14 and 14b in FIGS. 1, 2, or 3, respectively, and the compensating or balance lines or passages in the same figures should feed equal sized piston chambers at the same radial distance from the rotating axis of the clutch so that substantially the same increases in pressure caused by centrifugal force will occur.

In the embodiment of the invention illustrated in FIG. 3, the piston 60 may take the form of a plurality of conventional pistons equally radially spaced around the stack of discs so that pressure is applied at a plurality of points to achieve a uniform compressing or stacking action of the discs, again in a conventional manner, or piston 60 may be an annular type piston extending around the full circumference of the disc stack with plungers extending thereof engaging the stack of discs at a plurality of points when the pressure is applied. This type of annular piston is also well known in the art and, of course, requires an annular mating cylinder to function properly. In any event, the wear compensating features of unit 66 could be incorporated into either design. It should be understood that the accumulator 24a should be mounted as nearly on center line as possible, or if more than one accumulator is utilized, in a balanced relationship so that the radial offsetting of the compensating line to the piston balances as nearly as possible with the centrifugal force acting on the hydraulic fluid in the actuating line. Also, since the accumulator system supplying the static hydraulic fluid head to the piston is a closed system, it will require regular maintenance to insure a full fluid level at all times. For these purposes, the check valve 28 and stop valve 26 as seen in FIG. 2 are provided.

A clutch of the type illustrated in the drawings is most applicable to large rotating elements of considerable weight and size, and wherein the r.p.m. requirements are high and the radial offset of the actuating piston from the rotating axis is rather large, although it can be applied to any radially offset rotating hydraulically actuated clutch or brake. The application rate of the clutch must occur very rapidly, and disengagement must also occur rapidly, and the disengaging feature is provided by the increase in static pressure in the spring-loaded accumulator acting through the hydraulic fluid onto surface 74, as defined above. Preferably, the clutch housing including members 34, 36, and 38, all of which rotate with element 30, are fabricated from steel and aluminum forgings. The clutch itself actually provides a heat sink which is comprised of the annular flange pressure plate 33, the plurality of interleaved discs, half of which are keyed to drum 34 and half to sleeve or inner ring 52. Wear pad segments of alloyed steel might be attached to certain of the discs in lieu of the sintered surface to give increased efficiency. Conventional air-cooling, or the like, may be incorporated into the design. The clutch can easily be removed for surfacing by having a removable breakdown between components 33, 34, 36, and 38. Thus, it should be understood that the clutch of the invention will operate with the same actuating pressure to the piston 60 at any speed up to its maximum operating r.p.m.

While in accordance with the patent statutes only one best known embodiment of the invention has been illustrated and described in detail, it is to be particularly understood that the invention is not limited thereto or thereby, but that the inventive scope is defined in the appended claims.

What is claimed is:

1. A device for rotatable members which comprises a first rotatable member, at least one friction element associated with and rotating with said first rotatable member, a second rotatable member in substantially axial alignment with and adjacent to said first rotatable member, at least one friction element associated with and rotating with said second rotatable member and adapted to cooperate with said friction element associated with said first rotatable member, hydraulically actuated piston means operatively carried by one rotatable member and cooperating with the friction elements to force them into and hold them in frictionally locked relation to each other when actuated, said piston means being radially offset from the axis of said one rotatable member which is characterized by means to apply a compensating force to said piston means to substantially equally counteract the hydraulic pressure increase to said piston means caused by the action of centrifugal force upon the rotation of said one rotatable member, and a spring loaded accumulator into which the hydraulic fluid associated with the means to apply a compensating force to said piston means is received upon actuation of said piston means to build up a pressure greater than the pressure built up by centrifugal force thereby forcing a return of said piston means to substantially its initial position after the actuation thereof.

2. A clutch according to claim 1 which includes a compensating piston means interacting with said piston means and of substantially the same size and the same radial displacement from the axis of said one rotatable member as said piston means, means to supply hydraulic fluid from a static source to the compensating piston means whereby the pressure developed by centrifugal force in said compensating piston will offset the pressure developed by centrifugal force in said piston means.

3. A clutch according to claim 1 where there are a plurality of friction elements associated and rotating with said first rotatable member and interleaved between a plurality of friction elements associated and rotating with said second rotatable member, and where all friction elements are slidable axially with respect to their respective rotatable member.

4. A clutch according to claim 1 which includes a check valve connected to the accumulator to dump excessive pressure, and means to fill the accumulator with hydraulic fluid.

5. A device for rotatable members which includes a first rotatable member having at least one cylinder, at least one friction element associated and rotating with said first rotatable member, a second rotatable member in substantially axial alignment with and adjacent to said first rotatable member, at least one friction element associated and rotating with said second rotatable member and adapted to cooperate with said friction element associated with said first rotatable member, piston means mounted in linearly slidable relation in the cylinder of said first rotatable member cooperating with the friction elements whereby actuation of said piston means causes a pressured frictional engagement between the friction elements, said piston means being radially offset from the axis of rotation of said first member, means to supply actuating hydraulic fluid to the cylinder to actuate said piston, which is characterized by means to hydraulically conteract the pressure of said actuating hydraulic fluid caused by centrifugal force by supplying compensating hydraulic fluid at the same radial displacement from the rotating axis of said first member to act on said piston means in a direction opposite to the actuating hydraulic fluid, and an accumulator to store the compensating hydraulic fluid during pressurization of the actuating hydraulic fluid, which builds up a slight pressure to return the piston means to its initial position after actuation, and which accumulator is mounted in substantial alignment with the rotating axis of the first member.

References Cited
UNITED STATES PATENTS

| | | |
|---|---|---|
| 2,328,091 | 8/1943 | Nutt et al. |
| 2,381,786 | 8/1945 | Tyler. |
| 2,939,558 | 6/1960 | Schjolin. |
| 3,213,989 | 10/1965 | Harting _____ 193—86 |
| 3,215,237 | 11/1967 | Davies et al. |

BENJAMIN W. WYCHE III, *Primary Examiner.*

U.S. Cl. X.R.

192—86, 111